United States Patent [19]

Johnson

[11] 3,754,161

[45] Aug. 21, 1973

[54] INTEGRATED CIRCUIT SYSTEM

[75] Inventor: William E. Johnson, Toledo, Ohio

[73] Assignee: Owens-Illinois, Inc., Toledo, Ohio

[22] Filed: July 14, 1971

[21] Appl. No.: 162,642

Related U.S. Application Data

[63] Continuation of Ser. No. 821,306, May 2, 1969, Pat. No. 3,614,739.

[52] U.S. Cl......... 315/169 TV, 307/303, 315/169 R, 317/101 A

[51] Int. Cl.......................... H05b 37/00, H02b 1/04

[58] Field of Search............................ 307/294, 303; 315/169 R, 169 TV; 317/101 A

[56] References Cited

UNITED STATES PATENTS

| | | | |
|---|---|---|---|
| 3,493,812 | 2/1970 | Weimer | 307/303 X |
| 1,965,582 | 7/1934 | Foulke | 313/226 X |

*Primary Examiner*—Roy Lake
*Assistant Examiner*—Lawrence J. Dahl
*Attorney*—Donald K. Wedding et al.

[57] ABSTRACT

Solid state low level to high level interfacing circuits for multiple discharge gas discharge devices capable of feeding through a high level periodic sustaining voltage to the discharge device with minimum degradation. The output is the algebraic sum of the periodic sustaining voltage and a level converted logic signal. NPN circuits are used to drive one set of conductors in an array and PNP circuits are used for driving transversely related conductor arrays in the gas discharge device. Dielectric isolation in the fabrication of the integrated circuits is utilized and the circuits are such as to not require any inductance or capacitance elements, thus reducing cost and size of the circuits. The circuit appears as a low impedance to the load. There is no mixing of active elements (NPN vs PNP) in a circuit wafer or chip. Consult the specification for features and details.

3 Claims, 4 Drawing Figures

INTEGRATED CIRCUIT SYSTEM

Figure 1:
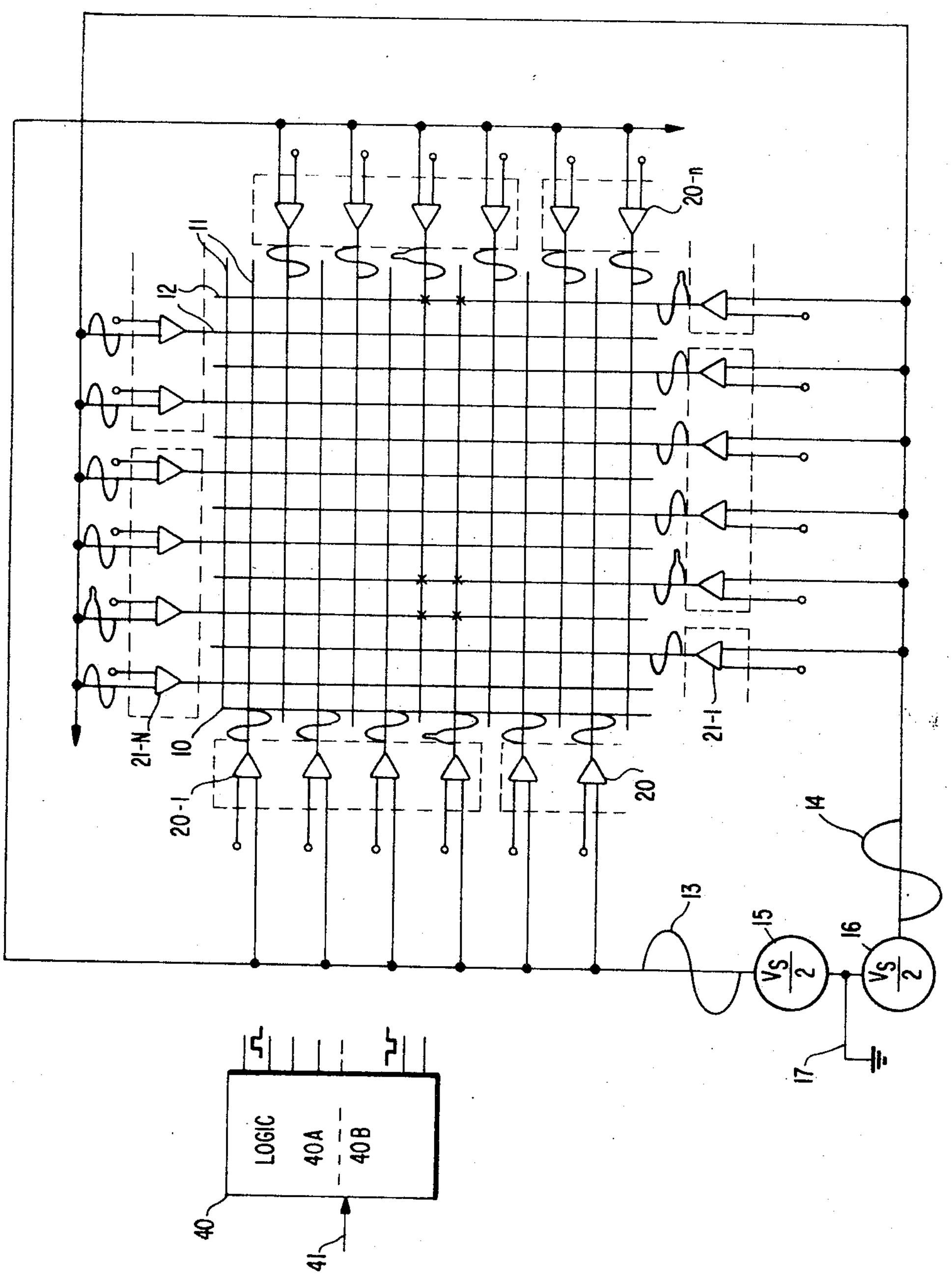

This is a continuation of U.S. Pat. application Ser. No. 821,306 filed May 2, 1969 now U.S. Pat. No. 3,614,739.

The present invention relates generally to driving circuitry for transversely oriented conductor arrays and matrices in display and/or memory panels and devices and more particularly to driving circuits for high voltage devices such as gas discharge panels, which are capable of being produced in integrated circuit form.

BACKGROUND OF THE INVENTION

In Baker et al. application Ser. No. 686,384 filed Nov. 24, 1967 (now U.S. Pat. No. 3,499,167) and entitled "Gas Discharge Display-Memory Device and Method" there is disclosed a multiple discharge display and/or memory panel which may be characterized as being of the pulsing discharge type having a gaseous medium, usually a mixture of two gasses at a relatively high gas pressure, in a thin gas chamber or space between opposed dielectric charge storage members which are backed by conductor arrays, the conductor arrays backing each dielectric member being transversely oriented to define or locate a plurality of discrete discharge volumes or sites and constitute a discrete discharge unit. In some cases, the discharge units may be additionally defined by physical structure such as perforated glassplates and the like and in other cases capillary tubes and like structures may be used. In the above-identified patent application of Baker et al., physical barriers and isolation members for discrete discharge sites have been eliminated. In such devices charged (electrons and ions) produced upon ionization of the gas at a selected discharge site or conductor cross-point, when proper operating potentials are applied to selected conductors thereof, are stored upon the surfaces of the dielectric at the selected locations or sites and constitute an electrical field opposing the electrical field which created them. After a firing potential has been applied to initiate a discharge, the electrical field created by the charges stored upon the dielectric members aid in initiating subsequent momentary or pulsing discharges on succeeding half cycles of an applied sustaining potential so that the applied potential, and hence the stored charges indicate the previous discharge condition of a discharge unit or site and constitute an electrical memory. However, because the conductor arrays utilized in creating such discharges are isolated from the gas medium by the dielectric means and because of the relatively high gas pressures, the potentials required for operating such panels are relatively high.

A significant improvement in operating voltage requirements has been achieved by utilization of an argon-neon gas mixture as disclosed in the application of James F. Nolan Ser. No. 764,577 filed Oct. 2, 1968, and assigned to the assignee of the present invention. The gas discharge panel disclosed in the Nolan patent application is filled with a gas mixture composed of about 99.9 atoms of neon and about 0.1 atoms of argon at an absolute pressure of 24.62 inches of mercury (hg). In a gas discharge panel constructed in accordance with the teachings of the Nolan application, a sinusoidal or periodic sustaining voltage is continually applied to all conductors of the panel at a measured frequency of about 50 KH to sustain discharges at selected discharge sites after they have been turned on at a higher voltage, a typical periodic sustaining voltage for the panel was in the range of 335 to 350 volts peak to peak. In dynamic operation, in addition to the sustaining voltage, a 2 microsecond pulse, is superimposed on and algebraically added to the sine wave applied to selected transverse conductor pairs in the conductor arrays to manipulate discharge conditions of discharge sites. Such pulse voltages were applied by means of pulse transformers and like devices in the manner disclosed in Johnson et al application Ser. No. 699,170 filed Jan. 19, 1968.

The present invention is directed to a solid state circuit useful as an interfacing circuit for a gas discharge panel, such solid state circuit being capable of being made as an integrated circuit not requiring the use of a pulse transformer. This results in a reduction in size and cost and enables the discharge condition manipulating pulses to be equal to a direct current power supply voltage which is common to all circuits of the same conductivity type. This commonality insures uniform pulse height not economically attainable when transformers are used.

Integrated circuits in accordance with the present invention are in two forms: one form utilizes PNP type semiconductor and the second form utilizes NPN type semiconductor. For gas discharge panels of the type disclosed in the aforementioned Baker et al. patent application, both forms are necessary to drive the transversely related conductor arrays. The PNP type semiconductor circuit is used to produce positive output pulses and the NPN type semiconductor circuit produces negative output pulses while in each circuit there is low power dissipation during quiescent conditions. Low power dissipation is a desirable feature since in a 4×4 inch display area, with conductor arrays having conductors on 30 mil centers, there will be approximately 33 conductors or lines per inch resulting in 132 conductors per array or 264 lines to be driven. Functionally, the circuits operate as low level to high level interfacing devices feeding through a high level periodic signal with minimal degradation. In effect, each individual circuit serves as a two input, one output device where one input is a high level periodic signal (the sustaining voltage) and the other input is a low level logic signal. The output is the algebraic sum of the high level periodic signal and the level converted logic signal and appears as a low impedance to the panel.

Objects of the invention include the provision of a solid state interfacing circuit for gas discharge devices capable of being produced in integrated circuit form with an attendant reduction in size and cost; improvement in uniformity of operating potentials applied to the panel; the elimination of transformers or other inductive devices as well as the elimination of capacitance elements in the circuits; low impedance circuits for driving gas discharge devices in which there is low power dissipation during quiescent condition; and circuits for converting low level logic signal to a high level operating voltage and algebraically adding the high operating voltage to a high level periodic sustaining voltage continuously applied to conductors of conductor arrays in the device.

Figure 2:
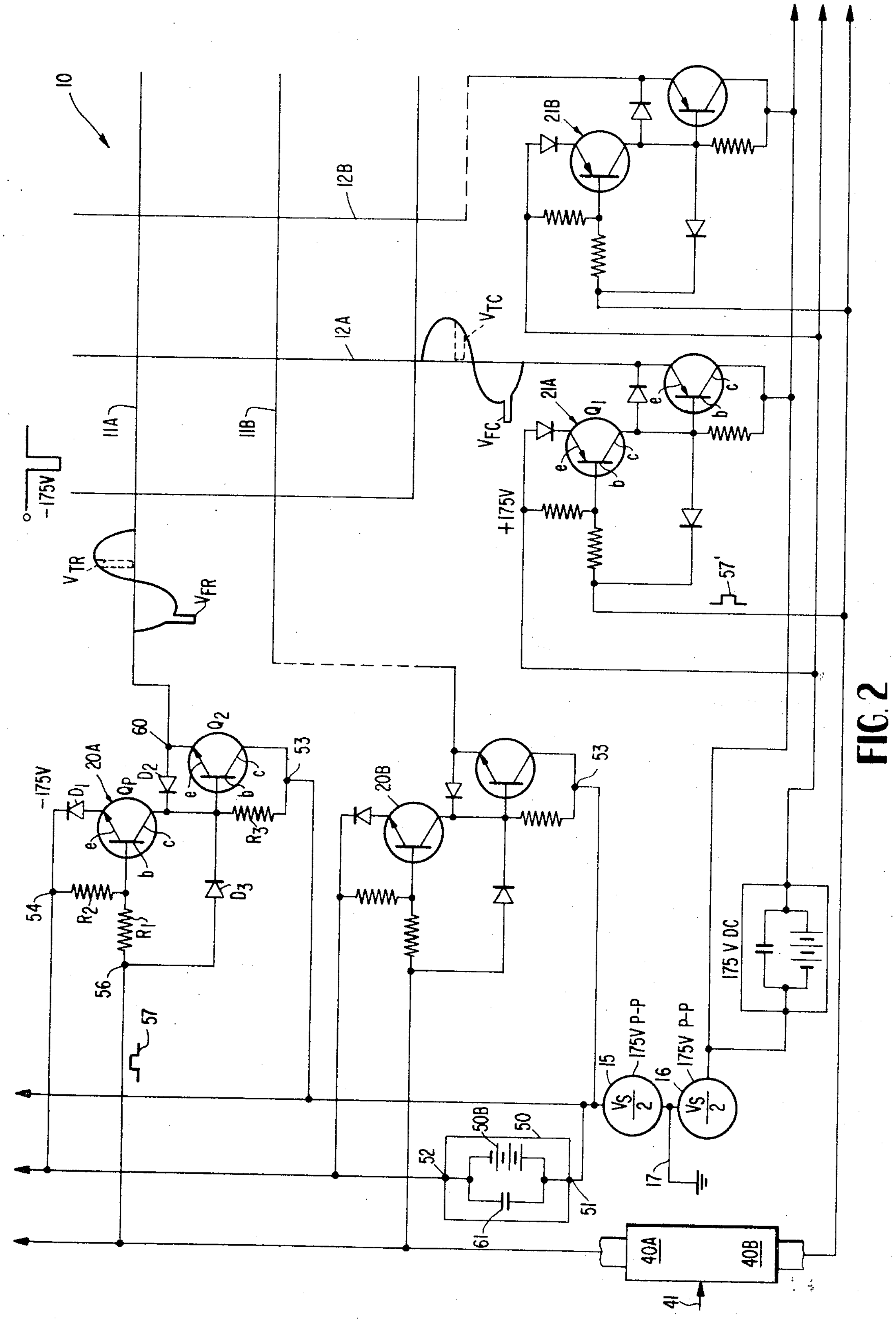
Figure 3:
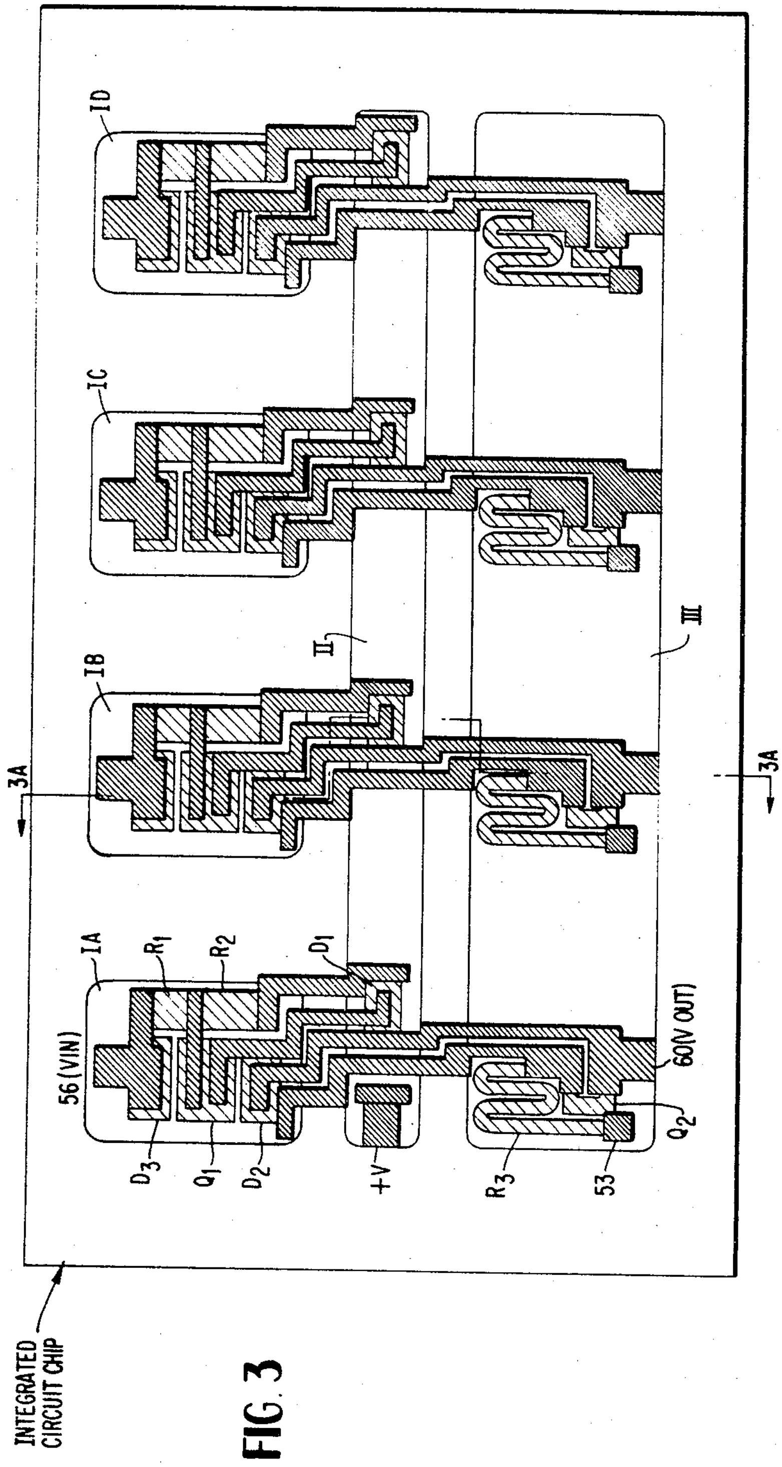
Figure 3A:
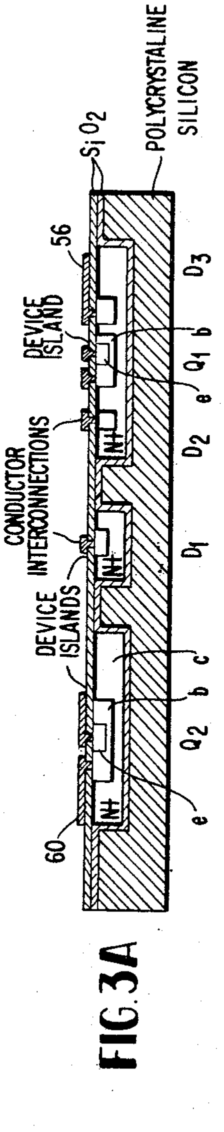

The above and other objects, advantages and features of the invention will become apparent from the following specification when considered with the accompanying drawings wherein:

FIG. 1 is a diagramatic illustration of a gas display panel and electrical driving system incorporating the invention, FIG. 2 is a partial circuit schematic diagram illustrating the invention as applied to driving a gas discharge panel, FIG. 3 is an enlarged view of an integrated circuit chip carrying one set of four of the interfacing circuits 20 and 21 of FIG. 2, and FIG. 3 A is a cross-sectional view of the integrated circuit chip taken on lines 3A — 3A of FIG. 3.

The invention will be described as it is employed in a system supplying operating potentials to a gas discharge display/memory device of the type described earlier herein. Such a device 10 is diagramatically illustrated in FIG. 1 of the drawings as having a horizontal or row conductor array 11 and vertical or column conductor array 12. Alternate conductors in an array are brought out at the sides, respectively, of the panel to facilitate making electrical connections thereto. Normally, oppositely phased periodic potentials 13 and 14 are applied to conductor arrays 11 and 12, respectively, so that approximately half the potential necessary to manipulate a discharge unit in a manner described later herein is applied per conductor. Thus, if the periodic potential across the gas in the discharge panel necessary to operate the device is 350 volts peak to peak, then one half this voltage is applied to the conductors of conductor array 11 and the other half (oppositely phased) is applied to conductors in conductor array 12 and such potentials are delivered from periodic voltage generator portions 15 and 16, respectively, (which may be of the type disclosed in Murley application Ser. No. 755,930 filed Aug. 28, 1968) having a common ground 17 so that panel 10 floats with respect to ground 17. It may be noted at this point, and as will be shown more fully hereinafter, sustaining potentials 13 and 14 pass through interfacing circuitry 20–1 . . . 20–N and 21–1 . . . 21–N with minimum degradation. As shown, sustaining potentials for all row conductors 11–1, 11–2 . . . 11–N of conductor array 11, are supplied from sustaining generator portion 15 and all vertical or column conductors 12–1, 12–2 . . . 12–N in conductor array 12 are supplied from sustaining voltage generator portion 16; and these potentials are continually applied to the conductor arrays on panel 10 during normal operation thereof. Individual discharge sites located by the crossing of selected conductors of conductor arrays 11 and 12 are manipulated by adding high-voltage unidirectional voltage pulses to the sustaining voltages on selected conductors of arrays 11 and 12, respectively, which, when combined, are sufficient to initiate a sequence of discharges, one for each half cycle of applied sustaining potential at any selected discharge site. By properly timing such pulses the sequence of discharges may be terminated so that any individual discharge site may be manipulated, "ON" and "OFF", by manipulation of the times of occurrences of the unidirectional voltage pulses.

As noted above in a 4 by 4 inch display area on a panel, with 30 mil spacing between conductors there may be 132 row conductors and 132 column conductors, each conductor of which, while having a common sustaining voltage applied thereto, must have the manipulating voltage pulses applied at selected times in accordance with the information to be displayed and/or stored upon the panel. Such large numbers of driving circuits per panel requires that the size and cost thereof be reduced as much as possible, and, at the same time, maintain the uniformity of potentials supplied to the conductors of the respective arrays. While such panels as the present invention is concerned with have been driven by pulse transformers and the like devices fairly successfully, it is desireable that use of large numbers of pulse transformers in commercial applications of such panels be eliminated.

In accordance with the present invention, each of the circuits 20 and 21 is formed as a circuit on an integrated circuit wafer or chip and while all similar or like circuits may be formed on a single wafer or chip, commercially, at the present time for yield purposes it is only feasible to place four such circuits on a single chip or wafer. Further, transistors used in the row conductor circuits 20–1 . . . 20–N are of the NPN types to produce a negative output pulse whereas transistors in the circuits 21–1 . . . 21–N are PNP type to produce a positive output pulse. As explained more fully hereinafter, obviously, NPN types may be used to drive column conductors and PNP types may be used to drive row conductors. At selected times, each of circuits 20–1 . . . 20–N and 21–1 . . . 21–N receive a low-level logic pulse (approximately 4 volts) from logic circuit 40 which may receive an input 41 from a computer or other digital data input device for display and/or storage on the panel. For example, the upper half 40–A of logic circuit 40 supplies row conductor interface circuit 20–1 with a positive logic pulse signal whereas the lower half 40A of logic circuits 40 supplies a negative logic pulse signal to column interface circuits 21 and in the normal operation, such positive and negative logic pulses are applied simultaneously to selected conductors to selectively initiate discharges and to terminate discharges at selected discharge sites within the panel 10. Such logic addressing circuitry or system may be relatively inexpensive line scan systems or the somewhat more expensive high speed random access system.

INTERFACING CIRCUITS

FIG. 2 shows a plurality of interfacing circuit 20A . . . 20B for driving individual row conductors 11A . . . 11B, respectively, of array 11 and a plurality of interfacing circuits 21 for driving column conductors 12A . . . 12B respectively in array 12. It will be noted that the circuit configuration 20A . . . 20B shown in FIG. 2 includes NPN type transistors and the circuit configuration 21A . . . 20B shown includes PNP type transistors; the difference between the circuits being for purposes of supplying oposite polarity and phase signals for driving associated conductors in the arrays.

Circuit configuration 20 will be described in detail, it being understood that except for reversal of direct current supply potentials and the conductivity type of the transistors involved, the operations are the same for circuit configuration 21. A low impedance, high voltage level direct current source 50 having a pair of output terminals 51 and 52 are connected to operating potential terminals 53 and 54 of interface circuit 20. Interface circuit 20 includes a first NPN transistor Q1 having its emitter E connected through diode D1 to input terminal 54. Collector C of transistor Q1 is connected through a collector resistor R3 to terminal 53. Resistor R3 is about 15,000 ohm, and is a compromise of rise time and power dissipation for bias current from the direct current coupled to transistor Q1 and transistor Q2. The base of transistor Q1 is connected through resistor R1 to logic signal input terminal 56 on which is applied a low level positive logic signal pulse 57 from logic circuit 40. There are a plurality of output conductors from logic circuit 40, one for each conductor interface circuit. Resistor R2 is connected between the base B of transistor Q1 and terminal 54 and is used with resistor R1 to match interface circuit 20 to the logic circuit 40. Resistors R1 and R2 may be eliminated if the interface circuit 20 is matched to the logic circuit 40. Diode D3 is connected between input logic terminal 56 and collector C of transistor Q1 and serves the same purpose as diode D1 in speeding up the response of transistor Q1 to an input logic signal. Diodes D1 and D3 are not essential to operation of the circuit and may be eliminated if desired. However, the circuit may incorporate diode AND gates (coincidence circuits) to thus reduce the necessary logic circuitry external the circuit, that is to say that the circuit may be fabricated to include a portion of the addressing logic circuits 41. A second NPN transistor Q2 has its base B connected directly to collector C of transistor Q1 and its collector C connected directly to terminal 53. Emitter E of transistor Q2 is connected directly to output terminal 60 which is connected directly to a conductor in conductor array 12. The collector C of transistor Q1 is connected through sensing diode D2 to the output terminal 60; diode D2 sensing the direction of current flow and aids in turning transistor Q2 ON and OFF as described more fully hereinafter.

Sustaining voltage generator portion 15 has its output terminal connected directly to input terminal 53 and to terminal 51 of the low impedance high-voltage level direct current voltage source 50. It should be noted that a capacitor 61 and a battery 50B are shown as constituting the low impedance high voltage level direct current source 50 so that the periodic sustaining voltage appears at both the collector C of transistor Q2 and the emitter E of transistor Q1, in the latter case via the bridging capacitor 61. Such capacitor 61 may be constituted by the filter capacitor means at the output of power supply 50.

OPERATION OF SYSTEM

Normally, transistor Q2 is conducting and transistor Q1 is non conducting so that the periodic voltage (approximately 175 volts peak to peak) from sustaining voltage generator portion 15 is applied through collector C of transistor Q2. On negative half cycles of the sustaining voltage current flows through collector C, base B of transistor Q2 and diode D2 to terminal 60 whereas on negative half cycles of sustaining voltage current flows through the collector-emitter circuit of transistor Q2 to the output terminal 60 so that there appears on output terminal 60 a sinusodial voltage corresponding to the waveform of the voltage from sustaining voltage generator portion 15. This sustaining voltage appears on all row conductors of conductor array 11 via the interfacing circuit 20 corresponding to the row conductor. In a similar fashion, the oppositely phased sustaining voltage from generator portion 16 appears on the column conductors of conductor array 12 via interfacing circuits 21.

Whenever a low level positive voltage pulse 57 from logic circuit 40 is applied to logic input terminal 56, and base B of transistor Q1, transistor Q1 is rapidly made conductive or turned ON so that the collector C thereof, which prior to switching of transistor Q1 had been at essentially zero direct current potential, rapidly falls (relatively) to the potential (−175 volts) of the high-voltage level direct current source 50 for the time period that transistor Q1 is in a switched or ON state. This high direct current voltage is passed through diode D2 to output terminal 60 to constitute one component of the output voltage during the time interval when the transistor Q1 is in its switched state. As noted earlier, the periodic sustaining voltage from generator portion 15 passes through the low impedance high-voltage level direct current voltage source 50 (via diagramatically illustrated capacitor 61) and also appears at the emitter E of transistor Q1 so that when transistor Q1 is switched ON, for the period of time that transistor Q1 is switched ON, this voltage is likewise passed through to collector C of transistor Q1 and thus, through diode D2 to appear as a second component of the output voltage appearing on output terminals 60. Thus the high direct current potential and the sustaining voltage are algebraically added to constitute a pulse voltage VFR for manipulating the discharge condition of a selected discharge site. In a similar fashion, a negative logic pulse 57' applied to one of interface circuits 21 (21A for example) connected to a column conductor (12A for example) of conductor array 12 is translated to a high level discharge manipulating pulse VFC on the selected column conductor. By properly timing the occurrence of logic pulse 57, the high voltage direct current pulse produced as a result of the switching action of transistor Q1 is algebraically added to a negative going half cycle of the sustaining voltage to constitute a firing voltage pulse VF applied to a selected discharge site simultaneously with the application of a similar pulse to a selected column conductor to thereby initiate a sequence of discharges in a selected gas volume or discharge site and thereafter, the sustaining voltage augmented by the potential due to stored charges, will sustain such sequence of discharges as described earlier. When it is desired to terminate a discharge, logic pulse 57 may be timed to occur at that part of the sustaining signal such that a controlled discharge of the addressed site is initiated resulting in extinction of the discharge process (e.g., terminating the sequence of discharges) on succeeding sustaining signal cycles, as more fully explained in Johnson et al. application Ser. No. 699,170, filed Jan. 19, 1968.

INTEGRATED CIRCUIT FABRICATION

FIG. 3 illustrates a top plan view of the integrated circuit device carrying four interface circuits on a single chip which may be contained within a hermetic enclosure or package (not shown) or otherwise protected from ambient environment. Individual contact terminals may have wires connected thereto and extending through the exterior of the package for connection to external circuitry.

The integrated circuit shown in FIG. 3 is preferably formed by the well-known dielectric isolation technique or process which, in general, is as follows: a device wafer and a handle wafer (not shown) are thermally oxidized and the oxidized surfaces are fused under pressure at high temperature. The device wafer is them chemically etched to a selected uniform thickness across the wafer and then the wafer assembly is thermally reoxidized. Using photolithographic techniques, the silicon dioxide on the wafer is photoengraved to form a mask which is used to etch device islands I, . . . III in the device wafer; N+ collector diffusion is made into the surface of the device islands to lower the collector saturation resistance and then the device islands are thermally oxidized. A layer of polycrystalline silicon is deposited over the oxidized device islands to a selected thickness and then the handle wafer is removed by chemical etching. The remaining single crystal device islands, insulated by silicon dioxide and embedded in the polycrystalline silicon matrix are thermally reoxidized to form an oxide coating which is used to mask against boron diffusion for the base geometry of the integrated transistor and diode components. Such device islands are identified by Roman numerals IA, IB, IC, ID, II and III; device islands IA, IB . . . containing transistors Q1 and diodes D2 and D3; device island II containing diodes D1; and device island III containing transistors Q2. It will be appreciated that a large number of integrated circuit chips may be formed simultaneously in a wafer. A boron diffusion is made into the silicon through the openings in the silicon dioxide. The diffused area is reoxidized. The emitters and collectors of the PNP transistors Q and Q2 are photoengraved and a P+ diffusion is made through the openings and the openings are reoxidized. The emitter is engraved for the NPN transistors and high concentration phosphorus is diffused to obtain the specified Beta for the NPN transistors. Cathode regions for the diodes are formed during emitter formation. The contacts for NPN and PNP transistors are photoengraved.

An oxide is deposited over the surface of the wafer by cracking $SiH_4$ in an oxidizing atmosphere, to form an insulating base for the deposition of tantalum nitride resistor components R1, R2 and R3. The tantalum nitride is sputtered in a vacuum to the proper thickness to obtain the required sheet resistivity. Immediately after sputtering tantalum nitride, aluminum is evaporated over the wafer surface. The aluminum is photoengraved to form the ohmic contacts for the tantalum nitride resistors and the tantalum nitride is photoengraved to form the actual resistors. Using the same contact mask, windows in the deposited oxide are opened and aluminum is evaporated over the surface of the wafer. This aluminum is photoengraved to form the interconnections of the components in the integrated circuit.

In FIG. 3, the active component areas are identified by Roman numerals IA, IB, IC, ID, II and III. Since collector of transistor Q1 is of the same conductivity type as the cathodes of diodes D2 and D3 and are commonly connected together electrically (see FIG. 2), they are formed in device islands IA, IB, IC, and ID. Since the high direct current potential commonly applied via contact area 54 to the anodes of D1 all of these diodes may be made in common island II. Similarly, all transistors Q2 of the same conductivity type are formed in common island III, and contact areas 53 apply the periodic voltage from generator portion 15 and terminal 51 of the direct current source 50 (FIG. 2) to the collectors C of all of these transistors.

Although other forms of integrated circuit fabrication may be used to structure the circuit, the dielectric isolation technique is preferred since at the present state of the art, this technique appears to provide the necessary isolation for the relatively high voltages which presently available gas discharge panels require.

The circuit affords a reduction in size, cost and power consumption and enables the output pulses to be equal to the DC power supply voltage which is common to all circuits of the same type to assure constancy and uniformity of voltage pulses. The two circuits (NPN and PNP) operate from two different floating high direct current voltage sources 50 and, when used with the sustaining generator portions 15 and 16, (FIG. 2), are connected to the outputs thereof at contact areas or terminals 53 and 54. Logic voltage pulse inputs to the circuits consist of low level logic signals (2 volts in amplitude for example), referenced to the high level direct current sources 50 (+V and −V, respectively), so the logic circuitry essentially will also float on the sustaining generator and the outputs are voltage pulses equal in amplitude to the voltage from sources 50 algebraically added to the sustaining voltage. By properly timing the times of occurence of the low level logic pulse inputs, selected discharge sits may be turned "ON" or fired as by the voltages $V_{TR}$ at the selected site.

While the circuit is uniquely adapted for monolithic or integrated circuit fabrication, the circuit may be structured from individual components. Exemplary components are as follows: transistors Q1 and Q2; MM4002 (MOTOROLA) for PNP; transistors Q1 and Q2 MM 3009 (MOTOROLA) for NPN; other components for both circuit R. 470 ohm, R2 1,000 ohm, R3 15,000 ohm, diodes D and D2 IN 3731 and diode D3 IN 643.

While the invention was made primarily for use with gas discharge devices it is apparent that the invention is applicable to other devices where low level pulses are to be transformed to high level pulses and algebraically added to a high level periodic voltage. In addition, other forms of sustaining voltage (square wave, gated sine waves, etc.) may be applied to the panel via the circuit disclosed herein.

Although a preferred embodiment of the invention has been described in detail, it is to be understood that various changes, substitutions and alterations can be made therein without departing from the spirit and scope thereof.

I claim:

1. In combination, an integrated circuit system for supplying sustaining voltages and discharge manipulating pulse voltages to one group of row conductors and one group of column conductors in a gas discharge panel in which transversely oriented row and column conductors effecting discharges in the gas have dielectric charge-storage means for charges produced on discharge, said dielectric charge storage means being interposed between said row and column conductors and the gas, said gas being composed of a mixture of neon and argon gases, at least a pair of monolithic semiconductor bodies, each said semiconductor body including a plurality of individual, electrically isolated transistor switching circuits connected by conductors in circuit configurations described hereinafter including a plurality of contact area to which connections to and from said circuit configurations are made, each said circuit configuration being functionally identical, wherein: each circuit configuration translates a low level input pulse signal voltage to a high level pulse signal voltage and feeding through a high level periodic signal voltage as said sustaining voltage, the output voltages from each circuit configuration being of opposite polarity, respectively, each said circuit also including means for causing same to appear as a low impedance during quiescent periods when said circuit is not translating a low level input pulse signal voltage to a high level pulse signal voltage.

2. The invention defined in claim 1 wherein said gas mixture is at a pressure of about 24.62 inches of mercury.

3. The invention defined in claim 1 wherein said mixture of gases consists essentially of about 99.9 percent neon gas and about 0.1 percent argon gas.

* * * * *